US008060388B1

(12) United States Patent
Huberman et al.

(10) Patent No.: US 8,060,388 B1
(45) Date of Patent: Nov. 15, 2011

(54) RESOURCE DISTRIBUTION (75) Inventors: Bernardo Huberman, Palo Alto, CA (US); Li Zhang, Palo Alto, CA (US); Fang Wu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 817 days.

(21) Appl. No.: 11/351,955

(22) Filed: Feb. 10, 2006

(51) Int. Cl.
*G06Q 10/00* (2006.01)
*G08B 5/22* (2006.01)
*G06F 9/30* (2006.01)
*G06F 9/40* (2006.01)

(52) U.S. Cl. ............................. 705/5; 340/4.6; 712/217
(58) Field of Classification Search ........................ 705/5
See application file for complete search history.

(56) References Cited

U.S. PATENT DOCUMENTS

| 2002/0161674 A1* | 10/2002 | Scheer ............................ 705/28 |
| 2002/0178034 A1* | 11/2002 | Gardner et al. ................... 705/5 |
| 2006/0200370 A1* | 9/2006 | Ratliff et al. ...................... 705/5 |

OTHER PUBLICATIONS

Beran, et al, "Long-Range Dependence in Variabie-Bit-Rate Video Traffic", IEEE Transactions on Communications, vol. 43, No. 2/3/4 Feb./Mar./Apr. 1995, pp. 1566-1579.
Clearwater, et al, "Swing Options: A Mechanism for Pricing IT Peak Demand", http://www.hpl.hp.com/research/idl/papers/swings/s, (2005).
Conlisk, et al, "Cyclic Pricing by a Durable Goods Monopolist", Quarterly Journal of Economics 99: 489-505 (1984).
Gale, Ian, "Advance-Purchase Discounts and Monopoly Allocation of Capacity", American Economic Review, vol. 83(1), pp. 135-46 (1993).
Gribble, et al, "Self-Similarity in File Systems", Measurement and Modeling of Computer Systems, pp. 141-150 (1998).
Huberman, et al, "Social Dilemmas and Internet Congestion", Science, vol. 277,535-537 (1997).
Sobel, Joel, "Durable Goods Monopoly with Entry of New Customers", Econometrica 59: 1455-1485 (1991).
Varian, Hal, "Price Discrimination", Chapter 10 in R. Schmaiansee and R. Willig (eds.), The Handbook of Industrial Organization, vol. 1, 597-654, Amsterdam and New York: Elsevier Science Publishers B.V., NorthHolland (1989).
Voldman, et al, "Fractal Nature of Software-Cache Interaction", IBM Journal of Research and Development. vol. 27, No. 6, Nov. 1981, pp. 164-170.
Wilson, Robert B., "Nonlinear Pricing", pp. 377-379, Oxford University Press (1993).

* cited by examiner

*Primary Examiner* — John Hayes
*Assistant Examiner* — David J Clark (57) ABSTRACT

Provided are techniques for allowing consumers to reserve a resource, in which potential consumers have a choice among a number of different reservation contracts for reserving a resource to be provided at a future time. Each reservation contract allows a corresponding contracting customer to elect whether to receive the resource and requires the contracting customer to make a first payment in aggregate if the resource ultimately is elected and to make a second payment in aggregate if the resource ultimately is not elected, with the first payment being higher than the second payment, and with both being nonzero.

22 Claims, 4 Drawing Sheets

RESOURCE DISTRIBUTION

FIELD OF THE INVENTION

The present invention pertains to systems, methods and techniques for reserving resources, and is particularly applicable to reserving time-dependent resources such as airline seats.

BACKGROUND

As used herein, a time-dependent resource is a resource that must be used or consumed within a limited period of time or else it is wasted. Ordinarily, the supply of a time-dependent resource is very difficult to alter, or becomes very difficult to alter as the time for providing the resource nears.

A common example of a time-dependent resource is an airline seat. Basically, each seat on any given flight must be sold or else it will be a wasted resource, from the airline's perspective. If given enough advance notice, the airline might be able to rearrange its flight schedule or add flights here or there. However, at some point, for efficiency reasons all or nearly all of the airline's planes become committed, making further changes very difficult. At that point, some limited accommodations might still be possible, e.g., in cases where an airplane is grounded for mechanical reasons, but large-scale scheduling changes to accommodate last-minute changes in demand simply are not made in practice.

On the other hand, because plans change, people become ill and other intervening circumstances arise, individual consumers often will not know in advance with certainty whether or not they will need, want or even be capable of using a seat on a flight to a particular destination at a particular time. Ideally, the consumer would like a seat to be available to him or her in case it ultimately is needed or desired. Unfortunately, making sufficient capacity available for the highest expected demand would be very expensive in most cases. Accordingly, an airline typically must engage in some guesswork about the actual demand that ultimately will materialize.

Such a lack of information makes it very difficult for the airlines to plan an efficient flight schedule, often resulting in disparities between supply and demand. For similar reasons, the pricing of airline tickets often appears to be erratic and nonsensical. One technique commonly employed by the airlines is to have an advance price (e.g., if a ticket is purchased at least 21 days in advance) and a much higher on-spot price. It is noted that the much-higher on-spot price often is charged even if the airplane has available capacity that otherwise would go unsold. Another common technique is to make available a refundable ticket, usually priced much higher than a non-refundable ticket.

Similar problems exist in other situations. For instance, a table at a restaurant, computer network resources and show tickets all are examples of time-dependent resources that potentially might be needed or wanted by any of a variety of different consumers.

As indicated above, generally only very crude attempts have been made to address the supply and demand problems associated with the pricing and/or reservations of time-dependent resources.

DESCRIPTION OF THE PREFERRED EMBODIMENT(S)

The present invention presents a mechanism for reserving resources, particularly time-dependent (or bursty) resources, that in exemplary embodiments is robust and incentivizes consumers to be honest about their anticipated needs. In more specific embodiments, consumers also are allowed and incentivized to communicate changes in the probabilities of their anticipated needs. As described in more detail below, such a method often can help consumers save costs and help providers to plan ahead so as to reduce the expected magnitudes of under-utilization and overbooking.

Figure 1:
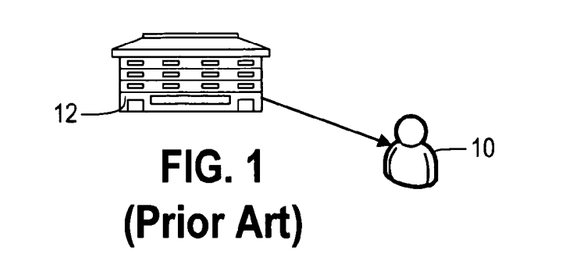
FIG. 1 is a block diagram illustrating a conventional technique for providing a resource to a consumer.

Initially, FIG. 1 illustrates a conventional technique for providing a resource to a consumer 10. As shown, the consumer 10 purchases the resource directly from a merchant or provider 12. As noted above, the price paid by consumer 10 often will vary depending upon when the resource is purchased, particularly when a time-dependent resource (e.g., an airline seat, a seat for a live show, computer network resources, or a restaurant table) is involved.

Figure 2:
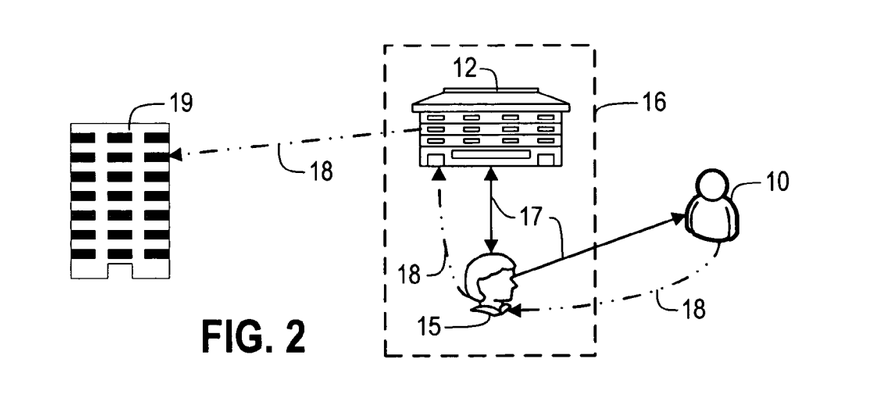
FIG. 2 is a block diagram of a system for providing a resource to a consumer according to a representative embodiment of the present invention.

As discussed in more detail below, and as illustrated in FIG. 2, representative embodiments of the present invention modify the conventional approach by utilizing a coordinator 15 who interacts between the merchant 12 and the consumer 10. Even in embodiments where a coordinator 15 is not actually used, the device of assigning certain tasks to a separate coordinator 15 is useful in explaining certain concepts underlying the present invention. Thus, in FIG. 2 merchant 12 and coordinator 15 are shown as being part of a single unit 16, with it being understood that in other embodiments of the invention coordinator 15 in fact functions completely or substantially independently of resource provider 12.

In the technique of FIG. 2, coordinator 15 obtains a supply of the resource 17 from merchant 12 and then delivers the resource 17, as applicable, to the consumer 10. As discussed in more detail below, the transaction conducted between coordinator 15 and consumer 10 also generates new information 18 that coordinator 15 preferably provides to merchant 12. Such information 18 optionally is provided by merchant 12 (and/or by coordinator 15, although not shown in FIG. 2) to other entities 19 for other purposes that are described in more detail below.

Figure 3:
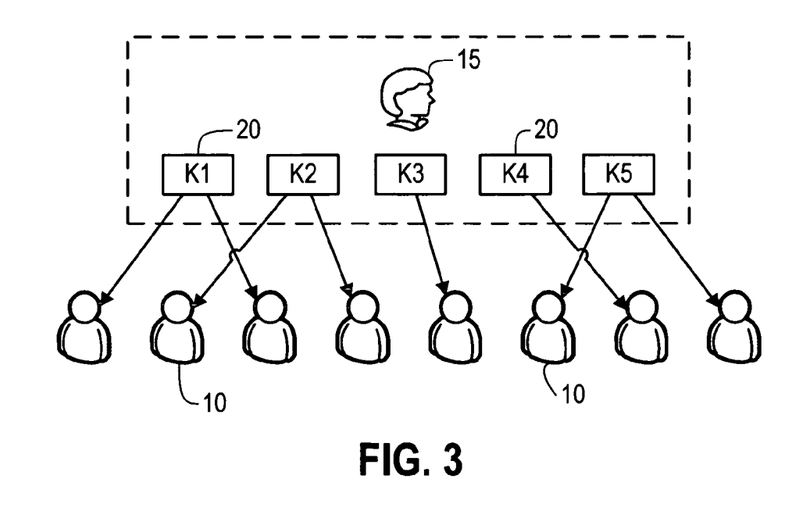
FIG. 3 is a block diagram illustrating the provision of reservation contracts to a variety of different potential consumers, according to a representative embodiment of the present invention.

FIG. 3 illustrates interactions between coordinator 15 and different potential consumers 10 according to the preferred embodiments of the invention. In such embodiments, the present invention is implemented by coordinator 15 providing potential consumers 10 with the ability to obtain any of a variety of different "reservation contracts" 20. As discussed further below, each such reservation contract 20 can be conceptualized as any of the following equivalent structures: a purchase of an option to purchase the resource 17, a purchase of the resource 17 with a right to obtain a partial refund if the resource 17 is not used, or a payment agreement where the consumer agrees to pay one amount if the resource 17 is used and a smaller (but nonzero) amount if the resource 17 is not used. Preferably, the reservation contracts 20 that are offered have different values to the consumer 10 depending upon the probability that the consumer 10 actually will end up using the resource 17. Accordingly, each consumer has an incentive to select the reservation contract 20 that best matches his or her estimate of the probability that he or she actually will use the resource 17.

Because of such incentives, the merchant 12 generally can be fairly comfortable that the corresponding probabilities (included within information 18) are reasonably accurate and, potentially subject to any systemic factors, are unbiased. As a result, the merchant 12 often will be able to use the resulting set of probability information for more intelligently planning its short-term and long-term supply and other business strategies.

Theoretical Discussion.

Assume a simple two-period model in which at the first period the potential consumer 10 knows his probability of using the resource 17 during the second period and purchases a reservation contract whose price depends on that probability. The coordinator 15 then aggregates the reservations from all consumers 10 and purchases the needed resource 17 from the provider 12. These resources 17 are then purchased in the second period.

Consider n consumers 10 $\{1, 2, \ldots, n\}$ who live for two discrete periods. Each consumer 10 might have to consume one unit of resource 17 in the second period, which he can buy from a resource provider 12 either in the first period at a discount price=1, or in the second period at a higher price=C>1. In the first period, each consumer 10 only knows an estimate of the probability $p_i$ that he will need the resource 17 in the next period. It is not until the second period that he can be certain about his need. Assume also that the distributions of the consumers' needs are independent.

Suppose all the consumers 10 wish to pay the least while behaving in a risk-neutral fashion. Consumer i can either pay 1 in the first period, or wait until the second period and pay C if it turns out he has to, an event that happens with probability $p_i$. If behaving rationally, he will use the former strategy when $Cp_i>1$ and, the latter strategy when $Cp_i<1$, so that his expected cost is $\min(1, Cp_i)$.

This optimal payment plan can be very costly for the consumer 10. For example, when C=5 and p=0.1, the consumer 10 always postpones the decision to buy until the second period, ending up paying 5 for every unit he needs.

The following describes a reservation mechanism that allows him to pay a small premium that guarantees his one unit of resource 17 whenever he needs it in the second period, at a price not much higher than the first-period discount price of 1. In addition, the mechanism incentivizes the consumer 10 to truthfully reveal his probability of using the resource 17. Based on this information, the provider 12 then can more accurately anticipate consumer demand. Later, it is shown how this mechanism can be thought of as an option.

To better illustrate this mechanism, consider the coordinator 15, who aggregates the consumers' probabilities and makes a profit while absorbing the consumers' risk. She does so in a two-period game, as follows.

In the first period, the coordinator 15 asks each consumer 10 to submit a probability $q_i$, which does not have to be the real probability $p_i$ that the consumer 10 will need one unit of resource 17 in period 2. Also in the first period, the coordinator 15 purchases $\Sigma q_i$ units of resource 17 from the resource provider 12 (at the discount price), for consumption in the second period.

In the second period, the coordinator 15 delivers the reserved resource units to consumers 10 who claim them. If the amount she reserved is not enough to satisfy the demand, she buys additional units of the resource 17 from the provider 12 (at the higher unit price C) to meet the demand. Each consumer i pays $f(q_i)$ if he uses his one unit of resource 17 and pays $g(q_i)$ if he does not use it, where $f$, $g$ are functions whose forms are described in more detail below.

The foregoing procedures and conditions preferably are completely transparent to everyone in advance. Each consumer i therefore expects to pay: $w(q_i)=p_i f(q_i)+(1-p_i)g(q_i)$ in the second period.

His optimal submission $q_i^*$ is determined by the first-order condition $$w'(q_i^*)=p_i f'(q_i^*)+(1-p_i)g'(q_i^*).$$

Truth-telling requires that $q_i^*=p_i$, or $$p_i f'(p_i)+(1-p_i)g'(p_i)=0.$$

In order to ensure that a consumer 10 will not claim a unit of the resource 17 when he does not need it, $$f(p) \geq g(p) \text{ for all } p \in [0,1]$$

Now, consider the situation when all consumers 10 submit their true probabilities $\{p_i\}$. Let U be the total resource usage of all consumers 10 in the second period, and let W be the their total payment. Clearly, $$E\{U\}=\Sigma p_i, \text{ and}$$

$$E\{W\}=\Sigma w(p_i).$$

If there exists an arbitrarily small $\epsilon>0$ such that $$w(p) \geq p+\epsilon \text{ for all } p \in [0,1]$$

then $$W-U \to \infty \text{ as } n \to \infty,$$

i.e., the coordinator makes profit when there are many consumers.

The small number $\epsilon$ is merely a technical device. In the following discussion it is replaced with the following weakened version as a sufficient condition:

$$w(p) \geq p \text{ for all } p \in [0,1]$$

At the same, the consumer 10 can save money by using the coordinator's service if:

$$w(p) \geq \min(1,Cp) \text{ for all } p \in [0,1]$$

Summarizing the above, the following conditions on $f$ and $g$ are sufficient to provide the desired truth-telling incentives:

$$pf'(p)+(1-p)g'(p)=0 \qquad \text{(Cond. 1)}$$

$$f(p) \geq g(p), \text{ and} \qquad \text{(Cond. 2)}$$

$$p \leq pf(p)+(1-p)g(p) \leq \min(1, Cp), \qquad \text{(Cond. 3)}$$

for all $p \in [0,1]$, where $f'(p)$ and $g'(p)$ are the respective first derivatives of $f$ and $g$ with respect top. The first condition guarantees that the consumer 10 cannot improve his expected price by submitting a false probability. The second condition ensures that a consumer 10 will not claim a unit of the resource 17 when he does not need it. The third condition ensures that the reservation contract will have an expected positive value for the coordinator 15 and will reduce the expected cost to the consumer 10.

Consider the following choice:

$$f'(p)=-k(1-p), \, g'(p)=kp, \qquad \text{(Equation Set 1)}$$

which clearly satisfies the first condition. Letting p=0 and 1 in the third condition gives two boundary conditions for $f$ and $g$:

$$f(1)=1, \, g(0)=0$$

The solution of Equation Set 1 with this boundary condition is:

$$f(p) = 1 + \frac{k}{2} - kp + \frac{kp^2}{2}, \qquad \text{(Equation 1)}$$

$$g(p) = \frac{kp^2}{2}. \qquad \text{(Equation 2)}$$

To check the solution, first calculate $$w(p) = \left(1 + \frac{k}{2}\right)(1 + k/2)p - \frac{k}{2}p^2. \qquad \text{(Equation 3)}$$

Then, it is not hard to show that for the identified solution the second and third conditions set forth above are satisfied for $$k \in [0, \min\{2(C-1), 2\}].$$

Figure 4:
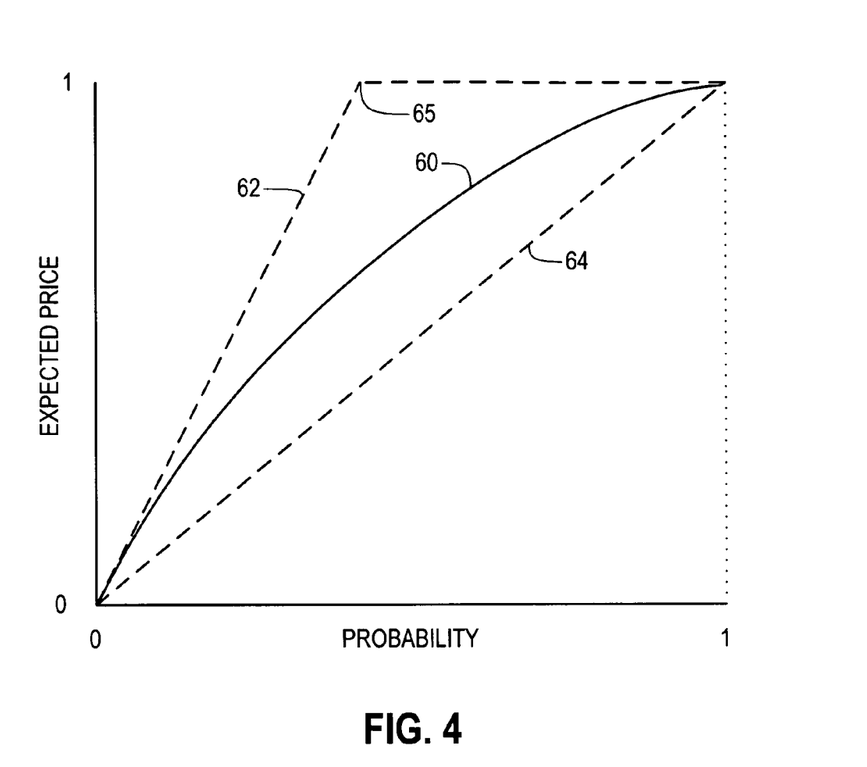
FIG. 4 is a chart comparing the expected cost to a consumer of a reservation contract, the rational consumer's expected cost in the absence of the present reservation contract, and the coordinator's expected cost with a reservation contract in place, according to a representative embodiment of the present invention.

FIG. 4 illustrates: the curve w(p) 60 for the case when C=2 and k=1.5; the rational consumer's expected cost 62 in the absence of the present reservation contract; and the coordinator's expected cost 64 with the reservation contract in place, across the entire range of possible probabilities p. If respect to curve 62, for p less than the probability corresponding to point 65 the rational consumer would wait until the second period to determine whether or not he needs the resource 17, and for p greater than the probability corresponding to point 65, the rational consumer would purchase the resource 17 in the first period, thereby fixing his cost at 1.

As can be seen, curve 60 lies completely between curve 62 and line 64. The difference between the upper curve 62 and the consumer price curve 60 is the amount of money the consumer 10 saves (varying with different p). The difference between the curve 60 and the lower line 64 is the coordinator's expected payoff from one consumer. Note that her payoff, as well as the expected benefit to the consumer 10, is larger for values of p lying in the middle of the range, and is zero for p=0 and p=1. This result hardly is surprising, for when there is no uncertainty the consumer 10 does not need a coordinator 15 at all.

Figure 5:
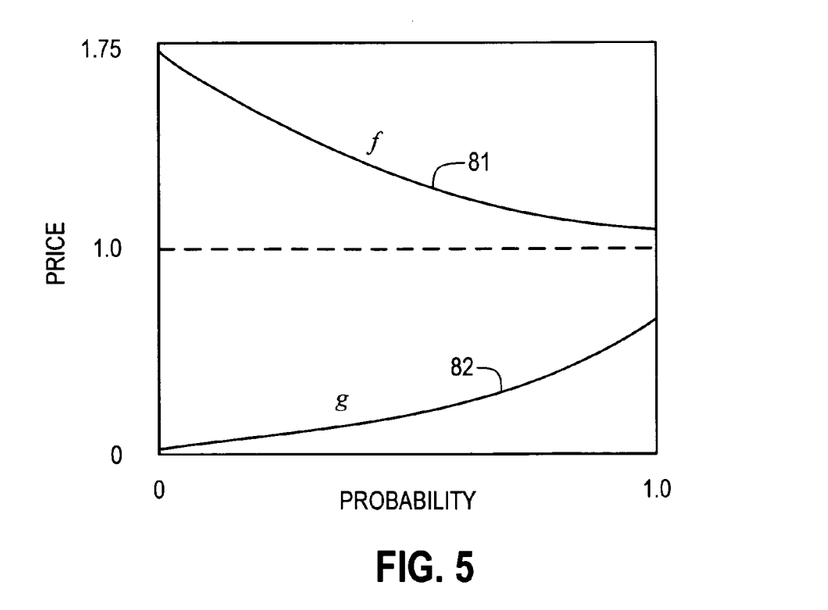
FIG. 5 is a chart showing the required payments by a consumer if a particular resource ultimately is demanded and also showing the required payments if the resource ultimately it is not demanded, across the entire range of possible probabilities, according to a representative embodiment of the present invention.

FIG. 5 plots the two payment curves, $f(p)$ and $g(p)$, for C=2 and k=1.5. After entering into a reservation contract with a consumer-selected value of p, the consumer 10 agrees to pay later either, the value of the upper curve 81 at that value of p (i.e., $f(p)$) for one unit of resource 17, or the value of the lower curve 82 at that value of p (i.e., g(p)) for nothing. Note that $f(p)$ is strictly decreasing, a feature essential for the consumer 10 to be truth-telling. The other conditions imposed above indicate that the consumer 10 would obtain the lowest expected price by selecting the value of p that most closely reflects his own true probability of using the resource 17. A consumer with a high p is more likely to pay the upper curve rather than the lower curve. Knowing this, he has an incentive to submit a high probability of use and thus not to cheat.

The contract discussed in previous sections can be equivalently regarded as an option. Because g(p) is the minimal amount the consumer 10 has to pay in any event; he can be asked to pay it in the first period, and only to pay $f(p)-g(p)$ in the second period if he needs one unit of resource 17 at that time. Hence, by paying an amount g(p), the consumer 10 achieves the right but not the obligation to buy one unit of resource 17 at price $f(p)-g(p)$ in the second period. Accordingly, g(p) can be called the premium or the price of option, and $f(p)-g(p)$ the price of the resource 17.

Figure 6:
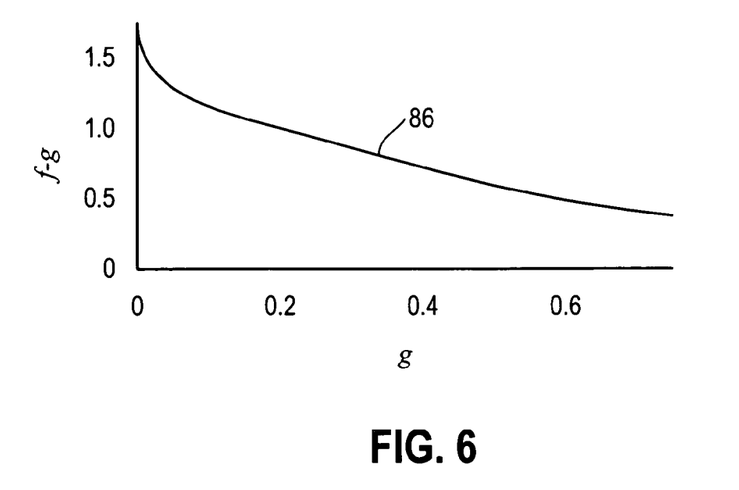
FIG. 6 is a chart illustrating the required payments by a consumer for each of a range of reservation contracts according to a representative embodiment of the present invention.

FIG. 6 shows the parametric plot 86 of resource price versus option price, for $p \in [0,1]$. Instead of submitting an explicit p, the consumer 10 can equivalently choose one point on this curve 86 and pay accordingly, i.e., trading off a lower g price for a higher $f$ price and vice versa. From the discussion above and from a review of FIG. 6 it will be observed that the consumer 10 pays a higher expected price the greater the error in his stated probability, thus incentivizing him to state his true probability as accurately as possible. His probability p can then be inferred from his contract choice (e.g., using Equation 2).

This alternative method of presenting the various option contracts that are available may be more consumer-friendly because people tend to be more sensitive to monetary values rather than to probabilities. The curve can be further simplified by providing the consumer 10 with a table with the values of a few discrete points along the curve 86.

Simple as it may seem, the two-period model can solve a wide range of reservation problems. Here, it is shown how the mechanism can be extended to solve more complicated problems, as when there is uncertainty not only in the consumption of one unit, but also in both the number of consumption units and their consumption time.

Example 1 (Uncertain number of units). By checking past web statistics, a company (in the role of the consumer 10) discovers that its website has the following pattern of visits: 90% of the days it needs one unit of bandwidth; 6% of the days it needs two units; 3% of the days three it needs units; and 1% of the days it needs four units of bandwidth.

Here, the company 10 faces a four-point distribution of usage rather than the two-point distribution (either 1 or 0) discussed in the two-period model. Imagine there are four units of resources 17: $U_1$, $U_2$, $U_3$ and $U_4$. The company's usage pattern can be written as $P(U_1)=0.9$, $P(U_1U_2)=0.06$, $P(U_1U_2U_3)=0.03$, and $P(U_1U_2U_3U_4)=0.01$. Breaking down to the individual unit, the pattern is $P(U_1)=1$ (at least one unit will be consumed with certainty), $P(U_2)=0.10$ (with probability 0.10 the company will need at least two units), $P(U_3)=0.04$, and $P(U_4)=0.01$. Thus, to efficiently reserve bandwidth for some day in the future, the company 10 can reserve (or purchase) one unit outright, and buy three options, all for the same day, with p=0.10, 0.04, and 0.01 respectively.

Example 2 (Uncertain consumption time). A biochemist definitely will need to use a public supercomputer to run some CPU-heavy simulations for one day next month, but he has no idea on which day he will need it. He wants to reserve the supercomputer now to save cost.

Say that the next month has 30 days. The probability that he will need the computer on one particular day next month is $p=1/30$. He can buy 30 "$p=1/30$" options, one for each day next month. For a numerical calculation, assume that $C>2$ and $k=2$. His total expected cost would then be $$30g\left(\frac{1}{30}\right) + f\left(\frac{1}{30}\right) - g\left(\frac{1}{30}\right) = 2 - \frac{1}{30} \approx 2,$$

so he pays less than 2 for an uncertainty over 30 days.

In the previous 2-period mechanism, if a consumer 10 learns more in time about the likelihood of his needing the resource 17, it is impossible for him to modify the original contract. To solve this issue, the mechanism is extended so that the consumer 10 can both submit early for a larger discount and update his probability afterwards to a more accurate one. Thus, consider a dynamic extension of the problem in which the consumer 10 is allowed to change his probability of future use some time after his initial submission.

More specifically, the foregoing two-period model is now extended to a multi-period model which incorporates changes that can occur over time in the consumer's probability of using the resource 17. In this more realistic scenario, consumers are allowed and incentivized to adjust their options according to updated information about their needs while remaining truthful at each time period.

Assume that everyone lives for three periods. In the third period, the consumer 10 might need to consume one unit of resource 17. He can either reserve one unit in the first period at a price of 1, or in the second period at a price $C>1$, or buy it in the third period at price $C^2$. It is noted that the third-period price may be different from $C^2$, which is used as an example only, and the main result set forth below still would apply. The additional second period is introduced to exploit the consumer's information-gaining process. In order to make this meaningful, the definition of the information structure, e.g., the meaning of "gain more information" should be considered.

Suppose that each consumer 10 can end up in either state A or state B in the second period. When in the first period, the consumer 10 knows his probability of entering each of the two states (A or B), but he does not know exactly which state he will enter until after the second period. In this sense, it can be said that the consumer 10 "gains" an extra bit of "state information" in the second period. His probability of consuming one unit of resource 17 in the third period actually depends on his state and he will thus report a more accurate probability once he gets the "state information".

Thus, the consumer 10 enters state A with probability $p_1$, and state B with probability $1-p_1$. If he enters state A, then with probability $p_{21}$ he will need the resource 17 in the third period. If he enters state B, then he will need the resource 17 with probability $p_{22}$. He knows these probabilities $(p_1, p_{21}, p_{22})$ at the beginning. Clearly, in the first period when he does not know in which state he will be in the second period, his probability of needing the resource 17 in the third period is $$p = p_1 p_{21} + (1-p_1) p_{22}$$

Example 3. On New Year's Day, a consumer is struggling against a paper deadline due on Feb. 1, which is for a conference to be held on Apr. 1. With probability 0.7 he will finish the paper before the deadline, and there is a 0.6 probability that the paper will get accepted. If he cannot finish it before the deadline, he can still submit a post-deadline paper, which will only be accepted with probability 0.2. He will be informed whether his paper is accepted some time after his submission. He is thinking of booking a plane ticket now. The three periods are Jan. 1, Feb. 1 and Apr. 1. The probabilities are $p_1 = 0.7$, $p_{21} = 0.6$, and $p_{22} = 0.2$.

Once again, consider a mechanism used by a coordinator 15 to make profit by aggregating the consumer's uncertainty. A consumer 10 may submit a probability in the first period, as in the 2-period setting. Additionally, when he enters the second period he is allowed to update his probability based on the new information that he has gained at that time. This way, the consumer 10 can enjoy the full discount while simultaneously utilizing the maximum information available to him. His final payment in the third period is determined by the one or two probabilities that he submitted. This whole mechanism, according to the preferred embodiments of the induction, is described more rigorously as follows.

In the first period, the consumer 10 may submit a probability $q_1$, which is suggested but not required to be the real probability $p = p_1 p_{21} + (1-p_1) p_{22}$ that he will need one unit of resource 17 in the third period. The coordinator 15 reserves (or purchases) $q_1$ units of resource 17 from the resource provider 12 (at price=1).

In the second period, the consumer 10 may submit a probability $q_2$, which is suggested but not required to be the real probability that he will need one unit of resource 17 in the third period, based on his information at this time (i.e., either $p_{21}$ or $p_{22}$ in the present example).

In the third period, if the consumer 10 claims that he needs one unit of the resource 17, the coordinator 15 delivers one unit to him. If the coordinator's inventory is not large enough, she buys more of the resource 17 from the provider 12 (at the higher unit price $C^2$) to meet the demand. The consumer 10 pays according to the following table:

|  | $q_1$ not $q_2$ | $q_2$ not $q_1$ | both $q_1$ and $q_2$ |
| --- | --- | --- | --- |
| uses one unit | $f_1(q_1)$ | $f_2(q_2)$ | $f_1(q_1) - \alpha f_2(q_1) + \alpha f_2(q_2)$ |
| does not use | $g_1(q_1)$ | $g_2(q_2)$ | $g_1(q_1) - \alpha g_2(q_1) + \alpha g_2(q_2)$ |

In the above table, $(f_1, g_1)$ and $(f_2, g_2)$ are two sets of 2-period truth-telling functions solved above.

$$f_1(p) = 1 + \frac{k_1}{2} - k_1 p + \frac{k_1 p^2}{2},$$

$$g_1(p) = \frac{k_1 p^2}{2},$$

$$f_2(p) = C + \frac{k_2}{2} - k_2 p + \frac{k_2 p^2}{2},$$

$$g_2(p) = \frac{k_2 p^2}{2},$$

where $k_1 \in [0, \min\{2(C^2-1), 2\}]$ and $k_2 \in [0, \min\{2(C^2-C), 2C\}]$. To make the mathematical analysis easier, choose $k_1 = k \in [0, \min\{2(C-1), 2\}]$ and $k_2 = Ck \in [0, \min\{2(C^2-C), 2C\}]$, so that $$f_2(p) = C f_1(p)$$

$$g_2(p) = C g_1(p).$$

We require that $f_2 > f_1$ and $g_2 > g_1$, so that the consumer 10 needs to pay more when he reserves late.

Consider the third column of the above table. The new parameter α>0 is a conversion ratio parameter. The expression $f_1(q_1)-\alpha f_2(q_1)+\alpha f_2(q_2)$ can be understood as follows. First, the consumer 10 signs a contract in the first period and agrees to pay $f_1(q_1)$ if he uses one unit of resource 17 later. Next, in the second period the consumer 10 can adjust his probability to $q_2$ by effectively "selling" some of his old $q_1$ contracts and "buying" some new $q_2$ contracts. Because he "sells" and "buys" in the second period, the selling and buying prices should be those in the second period, namely the $f_2$ and $g_2$ terms. In the contract form solution described here, the consumer 10 only signs one contract that takes care of two periods and does not do any trading. However, there is an equivalent option formulation in which the consumer does sell his options, which is described below.

Intuitively, because $f_2 > f_1$, α has to be small enough otherwise the consumers 10 would want to "buy" a lot of $q_1$ contracts in the first period and "sell" them later in the second period. In fact, it can be shown that there exists a nonempty region of α that allows the mechanism to work—that is, the consumer 10 can save cost (even more than using the 2-period mechanism) and the coordinator 15 can still profit.

We now describe the equivalent "option" form of the 3-period contract. Again assume $$f_2(p) = C f_1(p)$$

$$g_2(p) = C g_1(p).$$

In the first period, there are various options that the consumer 10 can buy, with option price $g_1(p)$ and resource price $f_1(p)-g_1(p)$, for all $p \in [0,1]$. The consumer 10 buys one $q_1$ option at price $g_1(q_1)$.

In the second period, the consumer 10 can swap αC (αC<1) share of his $q_1$ option for a $q_2$ option, by paying the difference price $\alpha C(g_2(q_2)-g_1(q_1))$. It is noted that the consumer 10 might be entitled to a partial refund as a result of such swap if this difference turns out to be negative, e.g., if $q_2$ is sufficiently less than $q_1$. In any event, he then holds a share $(1-\alpha C)$ of $q_1$ options and a share αC of $q_2$ options.

In the third period, if the consumer 10 needs one unit of resource 17, he executes his options. That is, he pays $(1-\alpha C)(f_1(q_1)-g_1(q_1))$ using his remaining $q_1$ option, plus $\alpha C(f_1(q_2)-g_1(q_2))$ using his $q_2$ option.

It is easy to verify that this option payment plan is equivalent to that set forth in the table above.

In a somewhat different formulation, the consumer 10 can swap αC share of his first-period $q_1$ option for a share of second-period $q_2$ option, by paying the difference price $\alpha g_2(q_2)-\alpha C g_1(q_1)$.

The option form of the 3-period contract can be easily extrapolated to an m-period contract (m>3). Assume β is a positive number such that $$\beta + \ldots + \beta^{m-2} = \frac{\beta - \beta^{m-1}}{1-\beta} < 1.$$

Such a β certainly exists. For example $0 \leq \beta \leq \frac{1}{2}$ is enough for Eq. (32) to hold for all m. The contract now is as follows.

In the first period, there are various options that the consumer 10 can buy, with option price $g_1(p)$ and resource price $f_1(p)-g_1(p)$, for all $p \in [0,1]$. The consumer 10 buys one share of $q_1$ option at price $g_1(q_1)$.

In any subsequent period i (i=2, ..., m−1), the consumer 10 can swap $\beta^{i-1}$ share of his $q_1$ option for a $q_i$ option by paying the difference price $\beta^{i-1}(g_1(q_i)-g_1(q_1))$.

In the final period m, if the consumer 10 needs one unit of resource 17, he executes his options. That is, he pays $$\left(1 - \frac{\beta - \beta^{m-1}}{1-\beta}\right)\left(f_1(q_1) - g_1(q_1) + \sum_{i=2}^{m-1} \beta^{i-1}(f_1(q_i) - g_1(q_i))\right).$$

Implementation.

Figure 7:
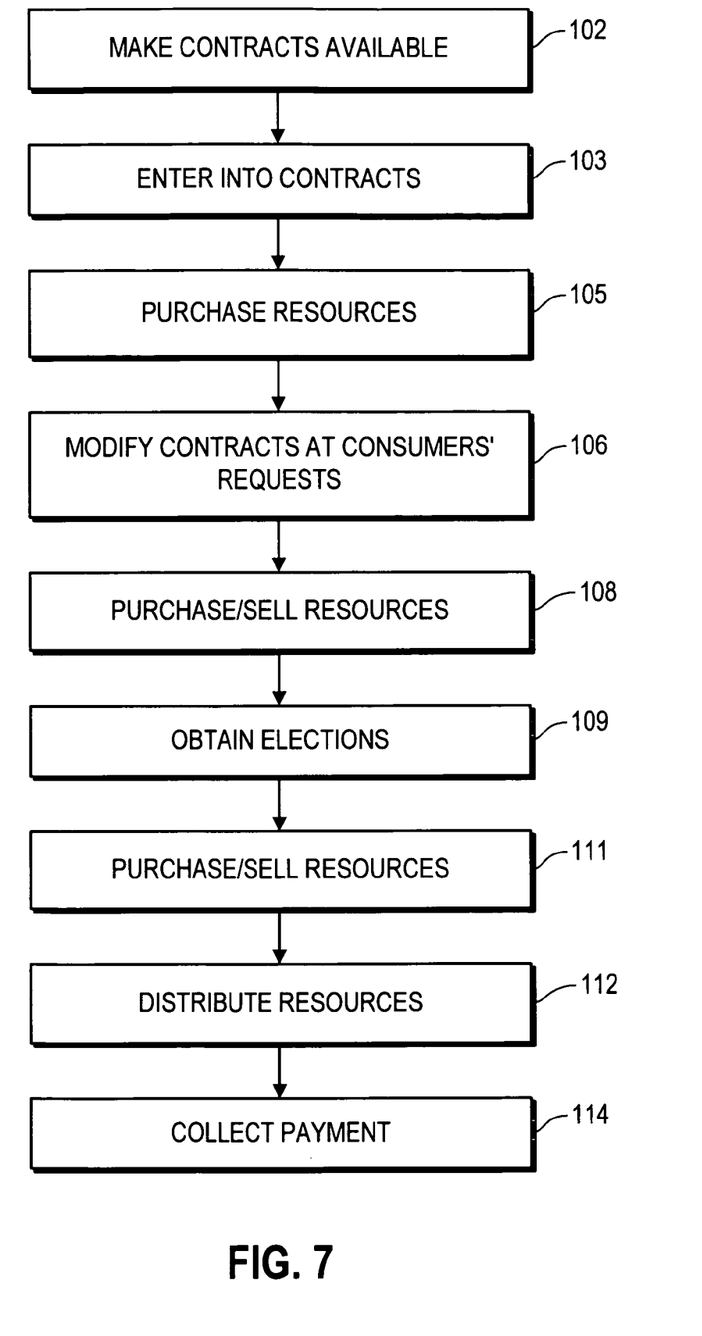
FIG. 7 is a flow diagram illustrating a technique of using reservation contracts to allocate resources according to a representative embodiment of the present invention.

FIG. 7 is a flow diagram illustrating a technique of using reservation contracts 20 to allocate resources 17 according to a representative embodiment of the present invention.

Initially, in step 102 a plurality of different reservation contracts 20 are made available to potential consumers 10. Such consumers 10 might include, e.g., the general public, only people in a particular organization or company, or only people in some other defined group.

As indicated above, the reservation contracts 20 can be visualized as any of the following equivalent structures: a payment agreement where the consumer 10 agrees to pay one amount if the resource 17 is used and a smaller (but nonzero) amount if the resource 17 is not used, a purchase of an option to acquire the resource 17, or a purchase of the resource 17 with a right to obtain a partial refund if the resource 17 is not used. Each of these structures has the consumer 10 paying one amount if the resource 17 is not used and a higher amount if the resource 17 is used. Other than the conceptual differences, the only significant differences among them are when the money ordinarily is paid. Typically, the consumer 10 will pay either $f$ or g under the payment agreement in the final period, when a determination has been made as to whether or not the consumer 10 actually has elected to use the resource 17 (in which case a total of $f$ is required to be paid) or not (in which case a total of g is required to be paid); however, a payment agreement typically can be flexible regarding when payments are required to be made. For an option, the consumer 10 typically will pay g upfront for the option and then pay $f-g$ only if the consumer 10 ultimately elects to use the resource 17. With a refund arrangement, the consumer 10 typically pays $f$ upfront and then gets a refund of $f-g$ if he ultimately elects not to use the resource 17.

As further indicated above, both $f$ and g are functions of a specified probability q. In the preferred embodiments, the consumer 10 is permitted to state the probability q, whether implicitly or explicitly, at least at some level of granularity. In one embodiment, the consumer 10 expressly states his expected probability of using the resource 17, e.g., by selecting among a set of options, such as whether he is 20%, 40%, 60% or 80% likely to use the resource 17. It is noted that 0% and 100% are not included in this embodiment, because if the consumer's estimated probability is 0% the consumer 10 would be better off simply not purchasing the resource 17, and his estimated probability is 100% he would simply purchase the resource immediately.

In another embodiment, the consumer 10 is presented with a set of payment choices, e.g., $\{f(20\%), g(20\%)\}$, $\{f(40\%), g(40\%)\}$, $\{f(60\%), g(60\%)\}$ or $\{f(80\%), g(80\%)\}$ (or $f$ and $f-g$ for each such probability) and allowed to select the one that best fits his needs. In a third embodiment, the consumer 10 is presented with both types of information, i.e., a set of costs for each of a plurality of different estimated probabilities and a notification of the probability estimate that the set corresponds to (or is optimized for). It should be noted that the foregoing three and embodiments differ only in the type of information that is presented to the consumer 10, with each providing the same choices regarding the available reservation contracts 20.

In the above examples, the consumer 10 is presented with a finite set of potential reservation contracts 20. In a further embodiment, the consumer 10 is allowed to select from across the entire continuous range of probabilities (i.e., from 0 to 1) or, correspondingly, from across the entire continuous range of payment choices. However, in most cases a fixed number of reservation contracts 20 will be adequate and less overwhelming from the perspective of the consumer 10.

The preferred forms of the actual functions $f(q)$ and $g(q)$ are described in detail above and therefore are not repeated here. However, as discussed in detail above, such functions preferably are selected so as to incentivize consumer 10 to select the reservation contract 20 that most closely matches his own estimate of the likelihood of ultimately using the resource 17 in question, while at the same time achieving excess value by aggregating the risks among multiple consumers 10 and apportioning some of that excess value to the consumers 10 themselves and some to the coordinator 15.

In step 103, a consumer 10 enters into a reservation contract 20 with coordinator 15. As noted above, in certain embodiments coordinator 15 functions more or less independently, dealing separately with the consumers 10 and with the resource provider 12. Typically, in such a case, the coordinator 15 also will handle reservation contracts for other unrelated resource providers, in addition to handling them for provider 12.

In any event, the way in which a consumer 10 enters into a reservation contract 20 preferably depends upon how the reservation contract is presented. If presented as a payment agreement, then the consumer 10 preferably signs a contract. If presented as an option, the consumer 10 preferably pays the price of the option (e.g., g) and in certain embodiments also signs a contract. If presented as a partial-refund opportunity, the consumer 10 preferably simply purchases the resource 17 (e.g., for a price of $f$) with an attached partial-refund policy (e.g., for a refund of $f-g$) in the event that the resource 17 ultimately is declined.

In step 105, the coordinator 15 purchases (or reserves) resources 17 based on the contracts that have been entered into. This is still in the "first period", discussed above, so that the coordinator 15 gets the fully discounted rate. Accordingly, based on her expected needs in fulfilling the demands of the consumers 10 that have entered into a contract 20 in step 103, the coordinator 15 preferably sums up all of the probabilities corresponding to the executed reservation contracts 20, i.e., $\Sigma q_i$ and purchases (or reserves) that quantity of the resource 17 (as above, assumed to be a price of 1 per unit, without any loss of generality).

It is noted that this step 105 can be omitted if the coordinator 15 is part of the same organization 16 as resource provider 12. In such a case, the per-unit price (e.g., 1) that underlies the calculation of $f$ and g preferably is used solely for internal accounting and planning purposes by organization 16. In alternate embodiments, coordinator 15 is treated independently even within the same organization 16 as resource provider 12, e.g., expected to show a net profit from her activities within the organization 16.

In step 106, the consumers 10 are allowed to modify their reservation contracts. More preferably, the consumers 10 preferably are permitted to update their estimated probabilities of using the resource 17 and thereby obtain modified $f$ and g values that preferably are optimized, with respect to the current point in time, based on that updated probability.

The preferred formats of the modified $f$ and g values have been discussed in detail above and therefore are not repeated here. Essentially, however, the modification involves an exchange of certain existing rights held by the consumer 10 for different rights (i.e., at the updated probability estimate), but with the new rights being priced based on the second-period cost of purchasing a unit of the resource 17. In this regard, it is noted that at this point in the process, it is assumed that everyone is in the "second period", discussed above, so that the less-discounted rate now applies (e.g., C>1). As discussed above, such a modification often will require a current net transfer of money or other consideration in order to accommodate the change in g.

Preferably, the modifications are presented to the consumer 10 in a manner similar to how the choice of reservation contracts 20 initially was presented in step 102 (e.g., any of the ways of presenting such information described above). The difference here is that the consumer 10 already has a contract in place with a stated $f$ and g, corresponding to a selected probability $q_{orig}$. Accordingly, the consumer 10 preferably is provided with a list of options $\tilde{f}, \tilde{g}$ corresponding to different $q_1 \neq q_{orig}$, together with the required current payment to accommodate the change to $\tilde{g}$.

Each such entry in the list generally will depend upon the terms of the original reservation contract 20. Therefore, the list of modification choices preferably is generated (e.g., in the manner described above) on-the-fly by an automated processor and then displayed to the consumer 10. As described above, in the preferred embodiments the modification options are selected so as to incentivize the consumer 10 to update the coordinator 15 regarding any significant changes in his estimated probability of using the resource 17 and to state such revised probability estimate as accurately as possible.

If desired, the consumer 10 makes a modification choice in this step 106. He then either makes any additional current payment or receives a partial refund, as applicable, based on the change in g.

Next, in step 108 the coordinator 15 preferably purchases (or if appropriate and possible, sells) sufficient units of resource 17 to achieve a total inventory of $\Sigma \tilde{q}_i$ units, where the $\tilde{q}_i$ is the complete set of revised probability estimates from the consumers 10. As with step 105, this step can be omitted if the coordinator 15 is part of the same organization 16 as resource provider 12. If not, then depending upon the arrangements made by coordinator 15, she might not be able to sell units of the resource 17 or might not be able to sell them at the same second-period price at which she can purchase them. In either of these scenarios, additional consideration on her part (which is beyond the scope of the present disclosure) is required to determine the appropriate purchasing/selling strategy, both in this step and earlier in step 105.

It is noted that in certain embodiments of the invention, steps 106 and 108 are repeated multiple times between the initial period in which the reservation contracts initially are entered into and the final period in which the resources 17 are consumed (i.e., resulting in multiple "second periods"). For that matter, what is deemed to be the "first period" often will be different for different potential consumers 10. For example, one customer 10 might have enter into a reservation contract on January 1 (making that his first period), modify it on February 1, and make a final determination whether to elect to receive the resource 17 on March 1, while another consumer 10 does not enter into his reservation contract until February 1 (making that his first period).

In step 109, the coordinator 15 obtains the elections from all of the consumers 10 as to whether or not they want to receive their unit of the resource 17. Any or all of such elections may be express or implied. For example, in one embodiment the consumers 10 are required to affirmatively elect to receive the resource 17 within a specified period of time before its scheduled consumption (e.g., as is typical with an option). In another embodiment, failure to turn in show tickets within a specified period of time before the performance is deemed to be an election to receive the resource 17 (i.e., in this case, the assigned theater seats for the specified performance).

In step 111, the coordinator 15 purchases (or if appropriate and possible, sells) units of resource 17 at the non-discounted rate to achieve a total inventory equal to the number of elections received. As with steps 105 and 108, this step can be omitted if the coordinator 15 is part of the same organization 16 as resource provider 12. If not, then once again, depending upon the arrangements made by coordinator 15, she might not be able to sell units of the resource 17 or might not be able to sell them at the same second-period price at which she can purchase them. For similar reasons, this can affect the earlier resource-acquisition decisions of steps 105 and 108.

In step 112, the coordinator 15 distributes the units of the resource 17 to the consumers 10 who have reservation contracts in place and who have elected to receive the resource 17 in step 109.

In step 114, coordinator 15 collects payment from the various consumers 10, depending upon the terms of their reservation contracts and whether or not they elected to receive the corresponding unit of resource 17. It should be noted that although this step 114 is shown and described as occurring at the very end of the process, this is for ease of explanation only. In practice, as noted above, some or all of the payments often occur earlier in the process, e.g., acceptance of the option price where the reservation contract is presented as an option agreement, payment of the full value f upfront where the reservation contract is presented as a purchase with right of partial refund (in which case some refunds will be paid at the end of the process), or payment in the amounts and at the times specified in a payment agreement, where the reservation contract was presented as such.

Figure 8:
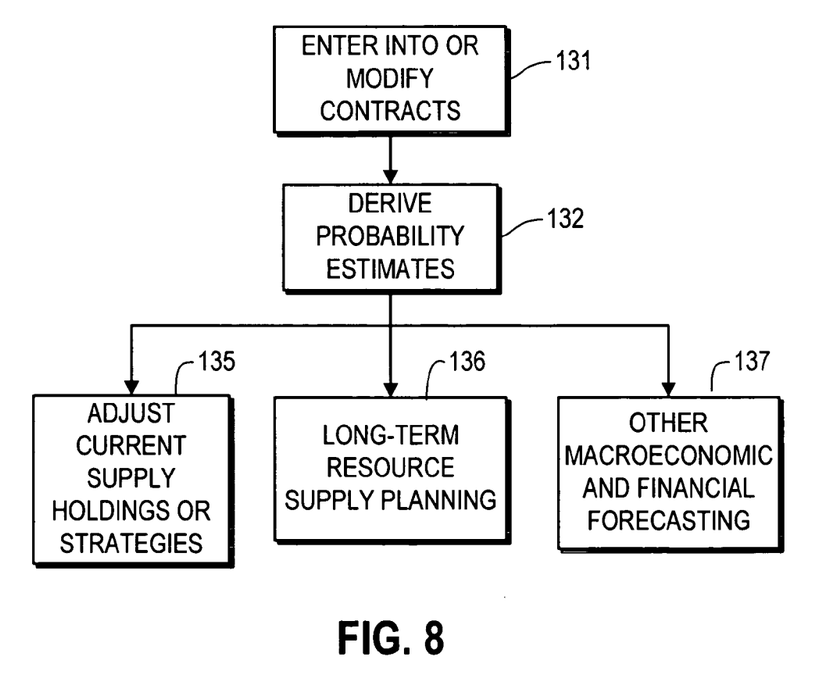
FIG. 8 is a flow diagram illustrating the derivation and use of probability and other information according to a representative embodiment of the present invention.

FIG. 8 is a flow diagram illustrating the derivation and use of probability information according to a representative embodiment of the present invention. Basically, the process of FIG. 8 is executed in conjunction with the process of FIG. 7, as should be apparent from the following discussion.

Initially, in step 131 one or more consumers 10 enters into or modifies reservation contracts 20. Preferably, the step corresponds to step 103 or 106, discussed above.

In step 132, the probability estimates corresponding to the reservation contracts 20 entered into in step 131 are derived. Because the terms of the reservation contracts 20 preferably are based on the underlying probability estimates, the performance of this step generally is fairly straightforward.

In steps 135-137 the probability estimates, together with any other information (collectively, information 18, as shown in FIG. 2) obtained in step 132 and/or from the reservation contracts 20 entered into, is used for any or all of the purposes discussed below. The other information that makes up information 18 preferably includes, e.g., demographic, past consumption and/or other behavioral data pertaining to the consumers 10.

In step 135, the resource provider 12 and/or the coordinator 15 adjust their supplies of the resource and/or their short-term strategies based on the information 18. Some possible actions that coordinator 15 takes are described above in connection with steps 105, 108 and 111. In certain embodiments, the early signaling about the likely demand for the resource 17 sometimes allows resource provider 12 to make other arrangements to increase the supply or, if possible, to move capacity to another area. Generally, such supply alterations only will be possible with the earliest information (i.e., the greatest lead time). In addition, in representative embodiments either or both of coordinator 15 and resource provider 12 alter their short-term strategies based on the early information, e.g., by putting more effort into marketing if demand appears to be weak, or potentially increasing prices if demand appears to be strong.

In step 136, the resource provider 12 uses the information 18 to adjust its long-term planning. For example, the provider 12 often will be able to get an early indication that increased capacity is needed, thereby getting a jump start on building up its infrastructure to accommodate increased future demand.

In step 137, the information 18 is used for forecasting other financial or macroeconomic measures that are not directly related to the resource. It is noted that the present invention gives rise to an entirely new type of information that was not previously available. Such information in and of itself potentially has value as an indicator of consumer confidence and for increasing the accuracy of economic and/or financial forecasts. Accordingly, such information preferably is sold or otherwise provided to other entities 19, such as financial institutions. There, the aggregate information 18 (particularly the probability estimate information) is tested for correlation (or similar measures of relatedness) to a variety of different financial and/or economic measures, such as those that are widely tracked in the economy. The identified relationships are then incorporated (using known techniques) into forecasting models for the identified measures in order to improve their forecasting accuracies.

It is noted that steps 131 and 132 preferably are performed repeatedly, thereby continuously providing updated information 18. Such updated information 18 preferably is supplied on an ongoing basis for any or all of the purposes 135-137 described above.

System Environment.

Generally speaking, nearly all of the methods and techniques described herein can be practiced with the use of a general-purpose computer system. Such a computer typically will include, for example, at least some of the following components interconnected with each other, e.g., via a common bus: one or more central processing units (CPUs), read-only memory (ROM), random access memory (RAM), input/output software and/or circuitry for interfacing with other devices and for connecting to one or more networks (which in turn, in many embodiments of the invention, connect to the Internet or to any other networks), a display (such as a cathode ray tube display, a liquid crystal display, an organic light-emitting display, a polymeric light-emitting display or any other thin-film display), other output devices (such as one or more speakers, a headphone set and/or a printer), one or more input devices (such as a mouse, touchpad, tablet, touch-sensitive display or other pointing device; a keyboard, a microphone and/or a scanner), a mass storage unit (such as a hard disk drive), a real-time clock, a removable storage read/write device (such as for reading from and/or writing to RAM, a magnetic disk, a magnetic tape, an opto-magnetic disk, an optical disk, or the like), and a modem (which also preferably connect to the Internet or to any other computer network via a dial-up connection). In operation, the process steps to implement the above methods, to the extent performed by such a general-purpose computer, typically initially will be stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other appliance or device, whether stand-alone, hard-wired into a network or wirelessly connected to a network. In addition, although a general-purpose computer system has been described above, in alternate embodiments a special-purpose computer instead (or in addition) is used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer instead may be used, such as a computer utilizing any combination of electronic, optical, biological and/or chemical processing.

Additional Considerations.

Preferably, the resources 17 to which the techniques of the present invention are applied are fungible, allowing an individual instance to be easily reallocated if a particular consumer does not elect to receive his optioned unit. By appropriately classifying available resources, it often will be possible to make individual instances fungible, e.g., airplane seats can be divided into first-class and coach-class, with a seat in each class being more or less interchangeable with other seats in the same class. In addition, the present techniques can be applied even if the individual instances are not completely interchangeable, particularly if an acceptable exchange or conversion rate exists.

Also, it should be noted that coordinator 15 has the ability to earn additional profits by analyzing the data 18 generated pursuant to the present invention. If the coordinator 15 discovers that consumers 10 systematically overestimate or underestimate their risk, or that particular categories of consumers 10 do, then the coordinator 15 preferably adjusts her purchases of resources 17 to reflect this, while at the same time earning the additional profits attributable to such systematic errors. For example, if a consumer 10 systematically estimates his probability of using a resource at 40% when it is really 30%, the coordinator 15 preferably uses the 30% figure for purchasing resources and simultaneously gets the higher g value based on the submitted 40% q.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of allowing a customer to reserve a resource, the method comprising steps performed by a computer system of:

providing a potential customer with a choice of a plurality of different reservation contracts for reserving a resource to be provided at a future time;

receiving from a contracting customer a selection of one of the plurality of different reservation contracts and a probability that the contracting customer will elect to receive the resource at the future time; and distributing the resource to the contracting customer who subsequently elects to receive the resource, wherein each of the plurality of different reservation contracts requires the contracting customer to make a first payment in aggregate if the resource ultimately is elected and to make a second payment in aggregate if the resource ultimately is not elected at the future time, wherein the future time comprises at least one of a point in time and an interval of time, and wherein the first payment is higher than the second payment and both are nonzero, and wherein the first payment and the second payment are both determined based upon the probability that the contracting customer will elect to receive the resource.

2. A method according to claim 1, wherein the different reservation contracts have different first payments, and wherein for each reservation contract the second payment varies inversely with the first payment.

3. A method according to claim 1, wherein different instances of the resource are substantially interchangeable with each other.

4. A method according to claim 1, wherein the reservation contracts are made available to a public customer base.

5. A method according to claim 1, wherein electing to receive the resource under at least one of the reservation contracts comprises failing to take a required action to decline or to return the resource.

6. A method according to claim 1, further comprising a step of deriving the contracting customer's estimate of his own probability of ultimately electing the resource based on which reservation contract the contracting customer selected.

7. A method according to claim 6, further comprising a step of repeating said deriving step for a plurality of additional contracting customers, thereby generating a set of probability estimates, and a step selected from a group consisting of: (i) using the set of probability estimates in order to calculate a current supply of the resources to be obtained and (ii) using the set of probability estimates for future resource supply planning.

8. A method according to claim 7, further comprising a step of using the set of probability estimates for forecasting at least one of future macroeconomic or future financial measures, not directly related to the resources.

9. A method according to claim 1, further comprising a step of permitting the contracting customer to modify the first payment and the second payment of the reservation contract.

10. A method according to claim 9, wherein a modification of the reservation contract reflects a shift in an estimate of a probability of electing the resource by the contracting customer.

11. A method according to claim 9, wherein the first payment and the second payment are modified based on an underlying price for the resource that is different than when the corresponding reservation contract initially was entered into.

12. A method according to claim 9, further comprising a step of deriving a changed estimate of the corresponding contracting customer's probability of ultimately electing the resource based on the modification, and a step selected from a group consisting of: (i) using the changed estimate in order to calculate a current amount of the resources to be acquired or sold; and (ii) using the changed estimate for future resource supply planning.

13. A method according to claim 1, wherein the different reservation contracts (i) correspond to different probabilities that the resource ultimately will be elected and (ii) are priced so as to incentivize the potential customers to select the reservation contract that most closely matches their own estimated probabilities that they will elect the resource.

14. A method according to claim 1, wherein the resource is selected from a group consisting of: a table at a restaurant at a specified time, an airline seat for a specified flight, an information technology resource for a specified period of time, a show ticket for a specified performance, a conference room for a second specified period of time, a hotel room for a third specified period of time and an other time-dependent resource.

15. A method of distributing resources, the method comprising steps performed by a computer system of:
  offering reservation contracts to a plurality of potential customers, wherein upon entering one of said reservation contracts a contracting customer obtains a right but not an obligation to acquire a quantity of a specified resource to be rendered at a specified future time;
  receiving from each contracting customer a probability that the contracting customer will elect to receive the resource at the specified future time;
  providing the specified resource to the contracting customers who elect to receive it; and
  obtaining payment from each contracting customer based on terms of the reservation contract entered and based on whether the contracting customer elected to receive the specified resource, and
  wherein the reservation contracts comprise a plurality of different types, each different type requiring the contracting customer to pay a smaller, but nonzero, first amount if the specified resource is not elected at the specified future time and a larger second amount if the specified resource is elected at the specified future time, and the first amount and the second amount are both determined based upon the probability that the contracting customer will elect to receive the resource.

16. A method according to claim 15, wherein different instances of the specified resource are substantially interchangeable, and wherein the different types of reservation contracts have different first amounts and each different type has a second amount that varies inversely with its corresponding first amount.

17. A method according to claim 15, further comprising a step of deriving a specified contracting customer's estimate of his own probability of ultimately electing the resource based on which reservation contract the specified contracting customer selected.

18. A method according to claim 17, further comprising a step of repeating said deriving step for a plurality of the contracting customers, thereby generating a set of probability estimates and a step selected from a group consisting of: (i) using the set of probability estimates in order to calculate a current supply of the resources to be obtained, and (ii) using the set of probability estimates for future resource supply planning.

19. A method according to claim 18, further comprising a step of using the set of probability estimates for forecasting at least one of future macroeconomic or future financial measures, not directly related to the resources.

20. A computer-readable medium on which is stored one or more computer programs, said one or more computer programs implementing a method of allowing a customer to reserve a resource, the one or more computer programs comprising a set of instructions for:
  providing a potential customer with a choice of a plurality of different reservation contracts for reserving a resource to be provided at a future time;
  receiving from a contracting customer a selection of one of the plurality of reservation contracts and a probability that the contracting customer will elect to receive the resource at the future time; and
  causing the resource to be distributed to the contracting customer who subsequently elects to receive the resource,
  wherein each of the plurality of reservation contracts requires the contracting customer to make a first payment in aggregate if the resource ultimately is elected and to make a second payment in aggregate if the resource ultimately is not elected at the future time,
  wherein the future time comprises at least one of a point in time and an interval of time, and
  wherein the first payment is higher than the second payment and both are nonzero, and wherein the first payment and the second payment are both determined based upon the probability that the contracting customer will elect to receive the resource.

21. The method of claim 1 wherein the contracting customer explicitly states the probability that the contracting customer will elect to receive the resource.

22. The method of claim 15 wherein the contracting customer explicitly states the probability that the contracting customer will elect to receive the resource.

* * * * *